(12) United States Patent
Mohammed et al.

(10) Patent No.: US 6,975,350 B1
(45) Date of Patent: Dec. 13, 2005

(54) USING ATOMIC COMMANDS WITH AN IMAGING DEVICE TO PREVENT THE TRANSMISSION OF INTERLEAVED SETS OF COMMANDS

(75) Inventors: Mannan A. Mohammed, Chandler, AZ (US); Bruce P. Clemens, Phoenix, AZ (US); Mark R. Fichtner, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/216,489

(22) Filed: Dec. 18, 1998

(51) Int. Cl.[7] .................... H04N 5/225; H04N 5/232
(52) U.S. Cl. .................... 348/207.11; 348/211.1
(58) Field of Search .............. 348/207, 211, 220.1, 348/14.08, 14.09, 552, 211.99, 211.4, 211.7, 348/211.6, 143, 207.1, 207.2, 207.11, 211.1, 348/211.2, 211.3, 211.5, 211.8, 211.9, 211.11, 348/211.12, 211.13, 211.14, 159, 207.99; 370/458, 229, 235; 710/100

(56) References Cited

U.S. PATENT DOCUMENTS

| | | | | |
|---|---|---|---|---|
| 4,817,177 A | * | 3/1989 | Shimizu | 382/276 |
| 5,111,288 A | * | 5/1992 | Blackshear | 348/143 |
| 5,444,476 A | * | 8/1995 | Conway | 348/14.1 |
| 6,107,937 A | * | 8/2000 | Hamada | 340/825.69 |
| 6,108,035 A | * | 8/2000 | Parker et al. | 348/169 |
| 6,137,485 A | * | 10/2000 | Kawai et al. | 715/719 |
| 6,137,527 A | * | 10/2000 | Abdel-Malek et al. | 348/77 |
| 6,237,106 B1 | * | 5/2001 | Koyama et al. | 713/502 |
| 6,266,082 B1 | * | 7/2001 | Yonezawa et al. | 348/159 |
| 6,313,875 B1 | * | 11/2001 | Suga et al. | 348/211.99 |
| 6,469,737 B1 | * | 10/2002 | Igarashi et al. | 348/211.3 |
| 6,556,241 B1 | * | 4/2003 | Yoshimura et al. | 348/211.99 |
| 6,646,677 B2 | * | 11/2003 | Noro et al. | 348/156 |
| 6,754,178 B1 | * | 6/2004 | Sasaki | 370/235 |
| 2001/0010545 A1 | * | 8/2001 | Sasaki | 26/91 |
| 2002/0135677 A1 | * | 9/2002 | Noro et al. | 348/143 |

* cited by examiner

Primary Examiner—Wendy R. Garber
Assistant Examiner—Justin Misleh
(74) Attorney, Agent, or Firm—Trop, Pruner & Hu, P.C.

(57) ABSTRACT

A method includes generating a first set of commands for an imaging device. The first set of commands are associated with a first task to be performed by the imaging device. A second set of commands are generated for the imaging device during a second time interval that overlaps the first time interval. The second set of commands are associated with a second task to be performed by the imaging device. The first set of commands is transmitted to the imaging device during a third interval of time, and the second set of commands is transmitted to the imaging device during a fourth interval of time that does not overlap with the third interval of time.

24 Claims, 5 Drawing Sheets

USING ATOMIC COMMANDS WITH AN IMAGING DEVICE TO PREVENT THE TRANSMISSION OF INTERLEAVED SETS OF COMMANDS

BACKGROUND

The invention relates to transmitting commands to an imaging device.

Referring to FIG. 1, for the purposes of electrically capturing an optical image 11, a typical digital camera 12 (of a digital imaging system 21) may include an array of photon sensing, pixel sensors 20. During an integration interval, each pixel sensor 20 typically measures the intensity of a portion, or pixel, of a representation of an optical image 11 that is focused (by optics of the camera 12) onto the pixel sensors 20. At the expiration of the integration interval, each sensor 20 typically indicates (via an analog voltage, for example) an intensity of light of the pixel.

The camera 12 typically processes the indications from the pixel sensors 20 to form a frame of digital data which digitally represents the captured image, and the frame may be transferred (via a serial bus 15, for example) to a computer 14 for viewing or may be stored in a flash memory of the camera 12. For video, the camera 12 may capture several optical images in succession and furnish several frames of data to the serial bus 15. Each of these frames indicates one of the captured images. The computer 14 may receive and use the frames to recreate the captured video on a display.

The computer 14 typically communicates with the camera 12 to control a task (a task of capturing a single still image or a task of capturing an image of a video, as examples) that is performed by the camera 12. In this communication, the computer 14 typically transmits commands to the camera 12, and each of the commands typically instructs the camera 12 to perform a specific function of the task, such as setting the aperture of the camera 12, for example. Because the camera 12 typically processes the commands in the order received, the computer 14 may transmit the commands for a particular task in a predefined sequence.

For example, to capture a still image, the computer 14 may initially transmit commands to set up the camera 12 to capture the image and then may transmit a command to instruct the camera 12 to capture the still image after a user presses a "Take" button on the camera 12 or invokes the capture under the control of a computer program. Lastly, the computer 14 may transmit a command that indicates how the resultant frame is to be delivered to the computer 14.

As an example, referring also to FIG. 2, a still image capture program 22 (when executed by the computer 14) may cause the computer 14 to generate a sequence 27 of commands 26 (commands 26a, 26b and 26c, as examples) to control functions (performed by the camera 12) that are associated with the task of capturing a still image. Some of the commands 26 may set up the camera 12 and may include, as examples, a command 26a to turn on the flash of the camera 12 and a command 26b to set the aperture of the camera 12. As another example, another command 26 may instruct the camera 12 to capture the image after the user of the camera 12 presses the Take button of the camera 12 or uses a program to issue the Take command.

Referring to FIG. 3, as another example, a video image capture program 24 may cause the computer 14 to generate a sequence 29 of commands 28 (commands 28a, 28b and 28c, as examples) to control functions (performed by the camera 12) that are associated with the task of capturing a video image. Some of the commands 28 may set up the camera 12 and may include, as examples, a command 28a to set the aperture of the camera 12 and a command 28b to set the exposure time of the camera 12. As another example, another command 28 may instruct the camera 12 to capture an image of the video.

Because most modern computers multitask the execution of programs, the computer 14 may interleave the execution of two programs (the video image capture program 24 and the still image capture 22 programs, as examples) that use the camera 12. However, a difficulty with this approach is that the execution of these programs may simultaneously generate command sequences and cause the computer 14 to interleave the transmission of commands that are associated with one task (to be performed by the camera 12) with the transmission of commands that are associated with another task. As a result of this interleaving, the camera 12 may not be set up properly to perform either task.

For example, the computer 14 may interleave the execution of the still image capture program 22 with the execution of the video image capture program 24. Both programs 22 and 24 may be simultaneously used by a photographer, for example, who may view video images via the video image capture program 24 to align camera equipment (adjust a tripod, for example) before mouse clicking on a visual interface "Take" button (provided by the still image capture program 22) to capture the still image. Because the computer 14 typically does not prevent both programs 22 and 24 from causing the computer 14 to generate sequences of commands that overlap in time, the transmission of the commands of the two sequences 27 and 29 may be interleaved to form an effective sequence 34 (see FIG. 4) that is received by the camera 12. However, the two tasks may each require different camera settings. For example, a task to capture a still image may have a different aperture setting than the aperture setting for the task to capture a video image. Thus, as a result of the interleaving, neither the still image capture program 22 nor the video image capture program 24 causes the computer 14 to properly set up the camera 12.

Thus, there is a continuing need for a digital imaging system that better accommodates the transmission of multiple command sequences to a digital imaging device.

SUMMARY

In one embodiment, a method includes generating a first set of commands for an imaging device during a first time interval. The first set of commands is associated with a first task to be performed by the imaging device. During a second time interval that overlaps the first time interval, a second set of commands is generated for the imaging device. The second set of commands is associated with a second task to be performed by the imaging device. The first set of commands is transmitted to the imaging device during a third time interval, and the second set of commands is transmitted to the imaging device during a fourth time interval that does not overlap the third time interval.

In another embodiment, a method includes setting up and capturing a first frame, including transmitting a first set of commands. A second frame is set up and captured which includes transmitting a second set of commands. Transmission of the first set of commands is prevented from being interleaved with the transmission of the second set of commands.

DETAILED DESCRIPTION

Figure 1:
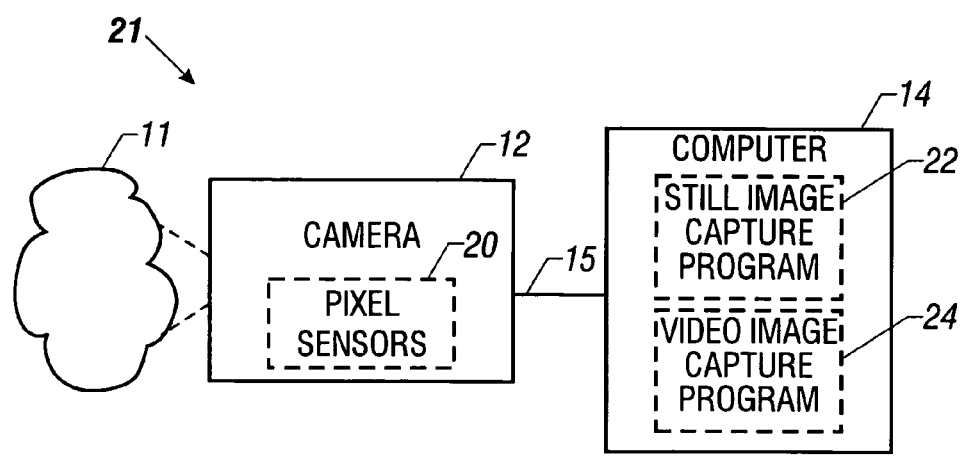
FIG. 1 is a schematic diagram of a digital imaging system of the prior art.
Figure 2:
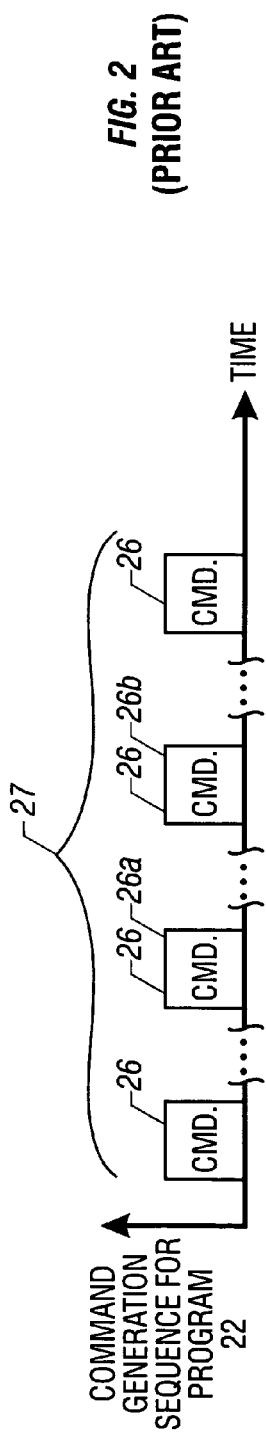
FIGS. 2 and 3 are illustrations of sequences of commands generated by programs executed by the computer of FIG. 1.
Figure 3:
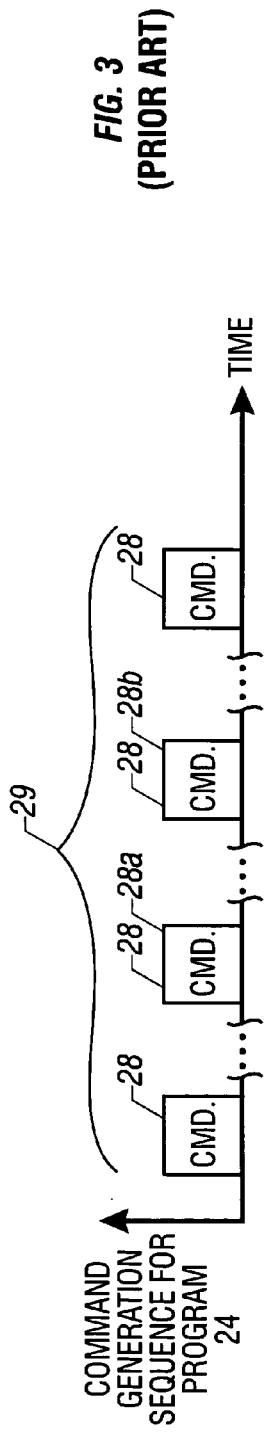
Figure 4:
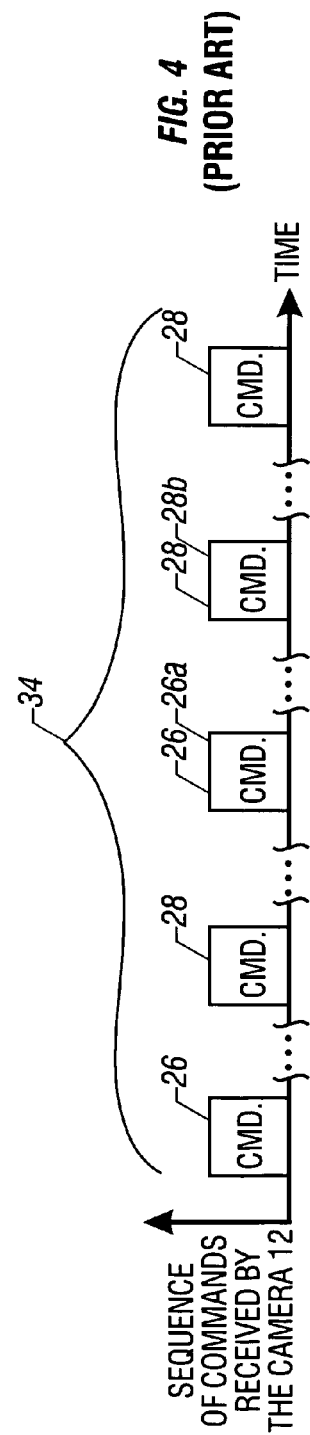
FIG. 4 is an illustration of a sequence of commands that is transmitted by the computer to the camera of FIG. 1.
Figure 5:
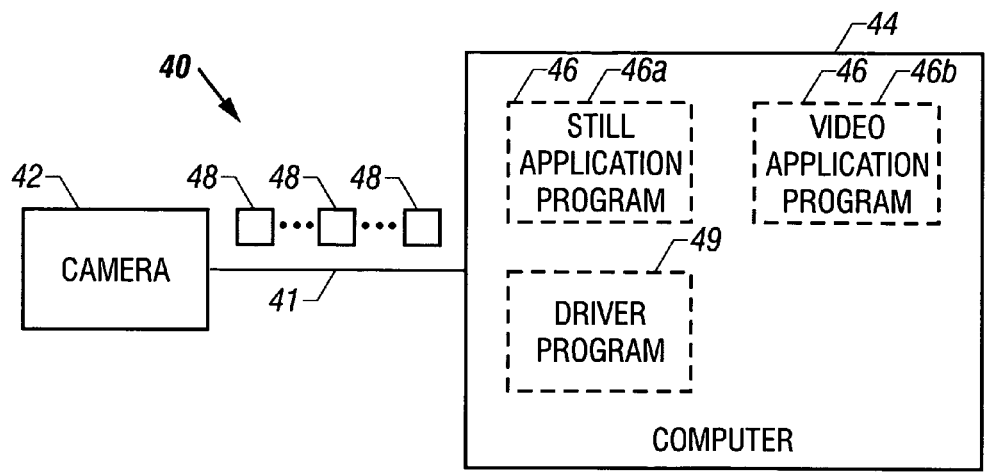
FIG. 5 is a schematic diagram of a digital imaging system according to an embodiment of the invention.

Referring to FIG. 5, an embodiment 40 of a digital imaging system in accordance with the invention includes a multi-mode digital camera 42 that is capable of capturing a video image (when in a video mode) and a still image (when in a still mode). Using its modes, the camera 42 is capable of performing camera tasks (tasks of taking still images and tasks of taking video images, as examples) that are controlled by a computer 44. In this manner, ring three application programs 46 (a still image capture program 46a and a video image capture program 46b, as examples) may be executed by the computer 44 in an interleaved fashion and cause the computer 44 to generate command sequences to control respective tasks that are performed by the camera 42. To ensure that the camera 42 receives one command sequence in its entirety before receiving commands of another command sequence (in one embodiment), the computer 44 may package commands 45 (see FIG. 11) for each camera task into an atomic command packet 48. For purposes of transmission, the command packet 48 is indivisible and thus, commands for other sequences are not transmitted by the computer 44 during transmission of the command packet 48. In this manner, each command packet 48 includes all of the commands 45 for a particular camera task, and the computer 44 transmits one command packet 48 at a time to the camera 42. As a result of this packaging, the camera 42 may process all of the commands 45 of a single camera task before processing commands 45 of another camera task.

In this context, the term "task" may refer generally to the functions performed by the camera 42 to set up the camera 42, to capture an image, and to deliver the frame indicative of the captured image to the computer 44. The camera 42 may perform each of these functions in response to one or more commands 45 that are received from the computer 44.

Figure 6:
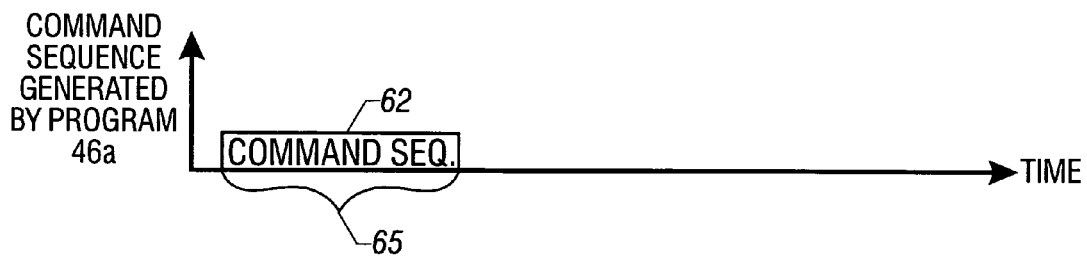
FIGS. 6 and 7 are illustrations of command sequences generated during overlapping intervals of time.
Figure 7:
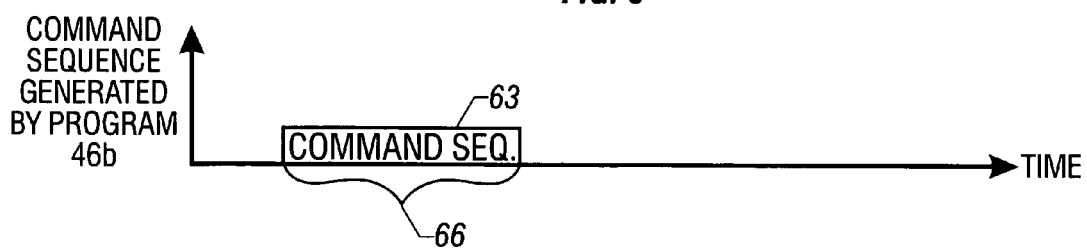
Figure 8:
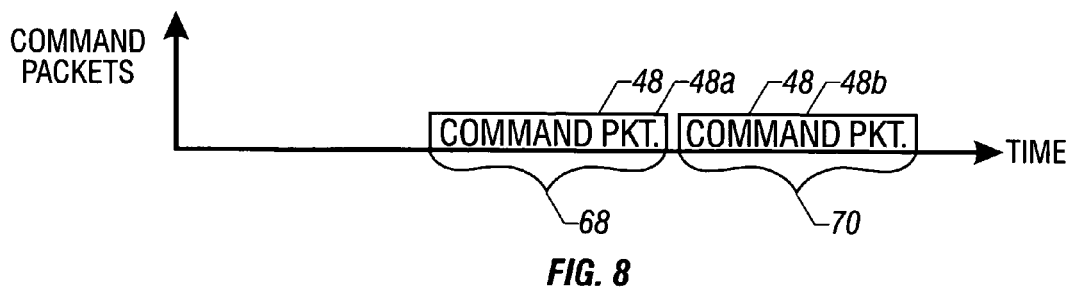
FIG. 8 is an illustration of the timing of command packets that are transmitted by the computer to the camera.

As an example, referring to FIGS. 6, 7 and 8, the program 46a may cause the computer 44 to generate a command sequence 62 (for a particular camera task) over a time interval 65 that overlaps another time interval 66 in which the program 46b causes the computer 44 to generate another command sequence 63 (for another camera task). Instead of transmitting commands for both sequences 62 and 63 to the camera 42 in an interleaved fashion, the computer 44 packages, or atomizes, the commands 45 for respective tasks into indivisible atomic command packets 48a and 48b and transmits the command packets 48a and 48b to the camera 42 over non-overlapping time intervals 68 and 70.

The advantages of packaging the commands for a particular task into a command packet may include one or more of the following: full capabilities of dual mode imaging hardware may be utilized; image streaming and still image capture of an imaging device may be accommodated; programs may alternatively use a camera to capture both video and still images; and multiple still image capture programs may be simultaneously used.

In some embodiments of the invention, the program 46 may cause the computer 44 to atomize, or form, a command packet 48 for the commands 45 (of a particular camera task) that are generated by the execution of that program 46. In this manner, instead of causing the computer 44 to provide the commands 45 one at a time (as the commands 45 are generated) to a ring zero, application driver program 49 (which furnishes the commands to a serial bus 41 (see FIG. 5) that couples the camera 42 to the computer 44), the program 46 may alternatively cause the computer 44 to store or "cache" the commands 45 until all of the commands 45 for the particular camera task have been generated, as described below.

Figure 9:
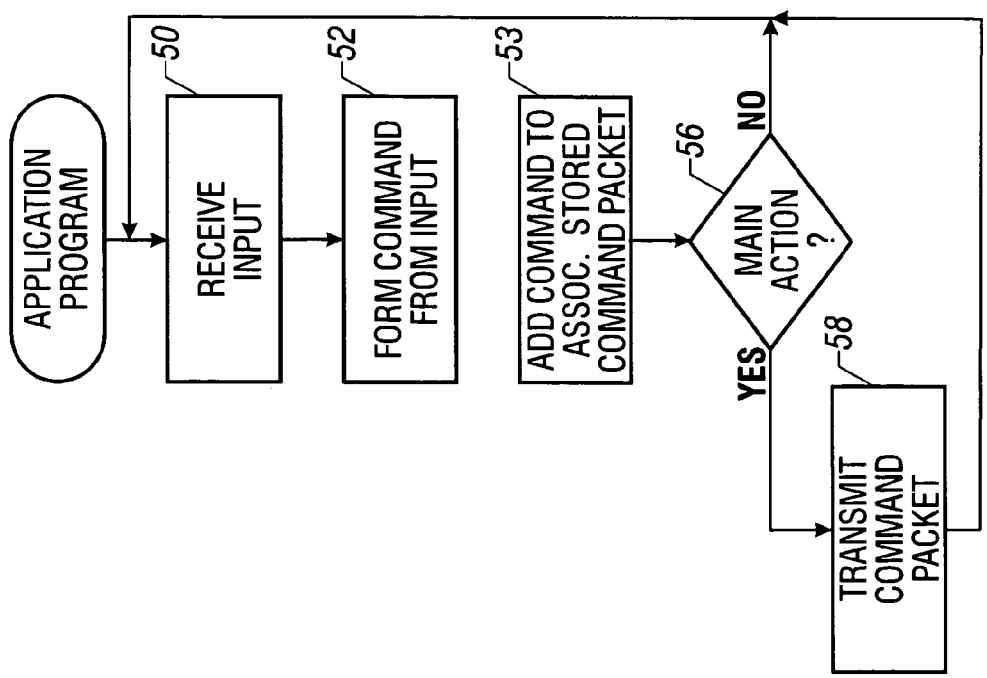

For the embodiments where the program 46 atomizes the command packet 48, the application program 46 may not be cognizant of other applications that are also atomizing command packets 48. As a result, for these embodiments, the driver program 49 may perform the final step of atomization of a particular command packet 48 by ensuring that one command packet 48 for a particular application is transmitted in its entirety (in some embodiments) before another command packet (from another application program, for example) is transmitted. Referring to FIG. 9, in this manner, for the generation of commands for a particular camera task, the program 46 may cause the computer 44 to receive (block 50) an input from a user that may, for example, instruct the computer 44 to provide a new aperture setting for the camera 42. In response to this input, the computer 44 may then form (block 52) a command 45 (a set aperture command, for example) from the input and add (block 53) the newly formed command 45 to the command packet 48 that is associated with the particular task.

The computer 44 may then determine (diamond 56) whether the command 45 is an action command, such as a command that instructs the camera 42 to, as examples, capture a frame of a video image, capture a frame of a still image, or deliver a frame indicative of a previously captured still image to the computer 44. If so, the command packet 48 is complete, and the computer 44 transmits (block 58) the command packet 48 to the camera 42 and returns to block 50. Otherwise, the computer 44 returns to block 50 without transmitting the command packet 48 to the camera 42.

Thus, the program 46 may cause the computer 44 to accumulate the commands 45 (to form the associated command packet 48) for a particular camera task until all of the commands 45 for the task have been generated. Once the command packet 48 is complete, the computer 44 transmits the command packet 48 to the camera 42. The driver program 49 causes the computer 44 to transmit each command packet 48 in its entirety to the camera 42. As a result, the commands 45 for different tasks are not received in an interleaved fashion by the camera 42.

Figure 10:
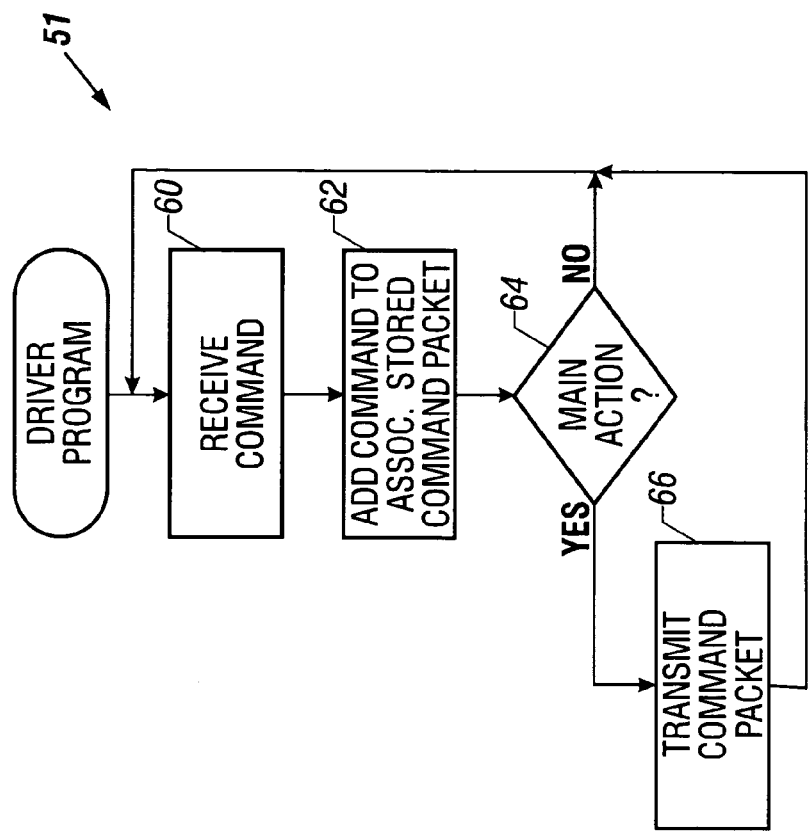
FIGS. 9 and 10 are flow diagrams of algorithms executed by the computer of FIG. 5 to control the timing of the command packets.

In some embodiments, the application program 46 does not participate in the atomization of the command packets 48. Instead, the driver program 49 may be replaced by another driver program 51 (see FIG. 10) which receives the commands 45 generated by the application programs 46 and packages the commands 45 into the command packets 48. In this manner, the driver program 51 may cause the computer 44 to receive (block 60) a command 45 from a ring three application program 46. The command 45 might be, for example, a command to set an exposure time for the camera 42. The computer 44 may then add (block 62) the command 45 to a current command packet 48 that is associated with the application program 46. The computer 44 then determines (diamond 64) whether the command 45 is an action command. The determination of whether the command 45 is an action command may include determining whether the associated application program is a still image capture program or a video image capture program. If the command 45 is a main action command, then the command packet 48 is complete, and the computer 44 transmits (block 66) the command packet 48 to the camera 42 and returns to block 60. Otherwise, the computer 44 returns to block 60 without transmitting the command packet 48.

Thus, the driver program 51 may cause the computer 44 to simultaneously build different command packets 48 for different programs 46. As the command packets 48 are completed, the driver program 51 causes the computer 44 to transmit each command packet 48 in its entirety to the camera 42.

Figure 11:
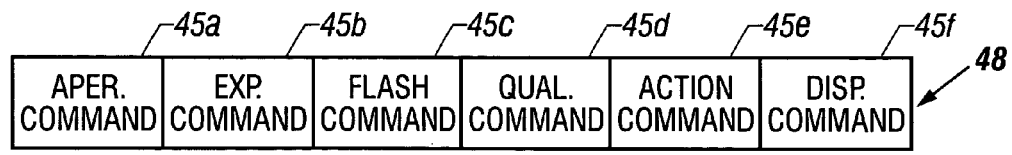
FIG. 11 is an illustration of a command packet generated by the program of FIG. 9 or 10.

An exemplary command packet 48 is shown in FIG. 11. The command packet 48 may have, as examples, an aperture command 45a (to set the aperture of the camera 42), an exposure command 45b (to set the duration in which the camera 42 is exposed to an image), a flash command 45c (to turn on or off the flash of the camera 42), a quality command 45d (to set the quality of the captured image to either poor, good or best), an action command 45e (to inform the camera 42 whether to take a still or a video image) and a disposition command 45f (to set the transfer mode (bulk or isochronous transfer) across the serial bus 41).

Figure 12:
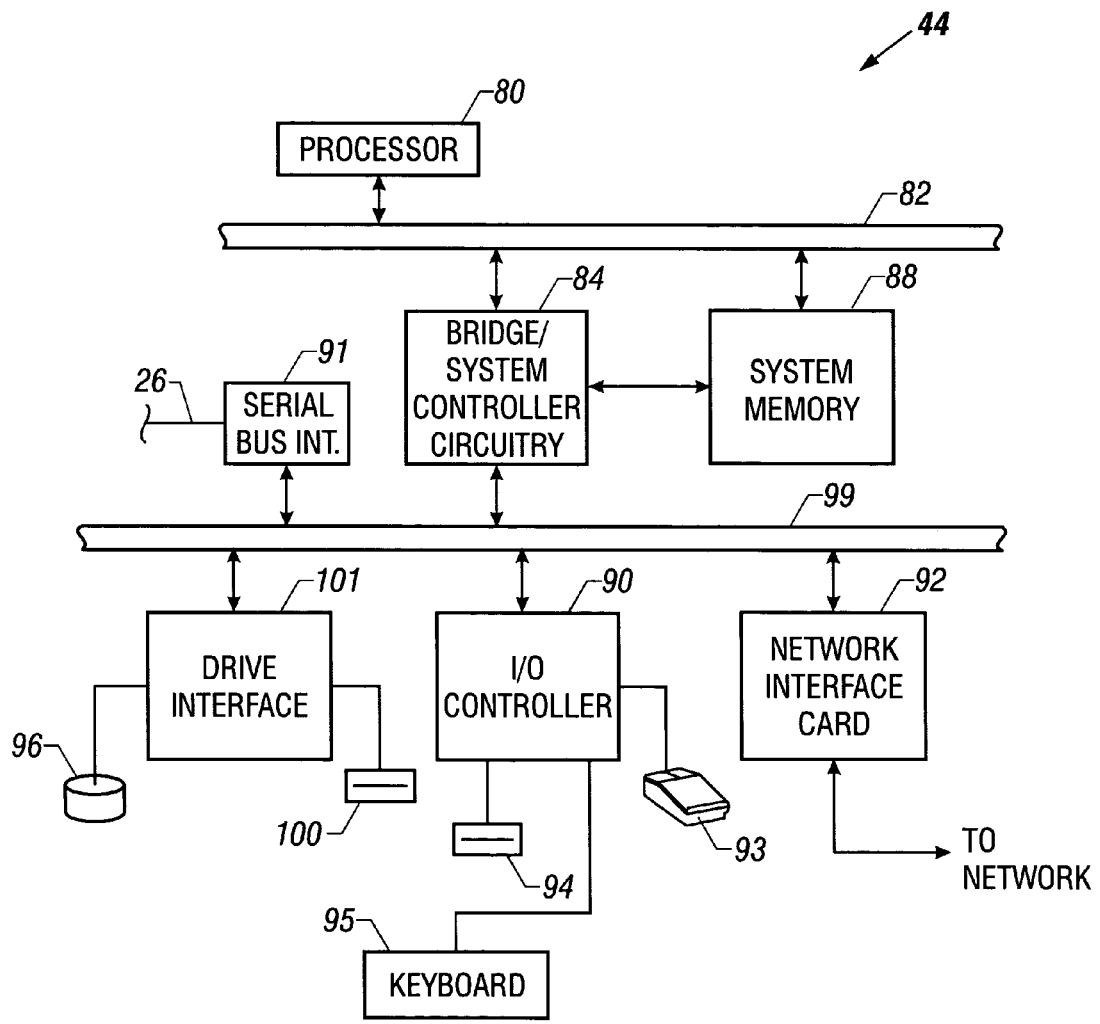
FIG. 12 is a schematic diagram of the computer of FIG. 5.

The computer 44 may be one of several different types of processor-based systems, such as a laptop computer or a desktop computer, as just a few examples. The term "processor" may refer to, as examples, one or more microcontroller(s) or microprocessor(s) (an X86 microprocessor, a Pentium microprocessor or an Advanced RISC Machine (ARM) microprocessor), as just a few examples. In this manner, referring to FIG. 12, as an example, the computer 44 may include a processor 80 that, in some embodiments, may execute copies of the application programs 46 which are stored in a system memory 88, and in some embodiments, the processor 80 may execute a copy of the driver program 51. In these embodiments, all or a combination of the programs 46 and/or 51 may configure the processor 80 to generate a first set of commands for an imaging device (the camera 42, as an example) during a first time interval, the first set of commands being associated with a first task to be performed by the imaging device; generate a second set of commands for the imaging device during a second time interval that overlaps the first time interval, the second set of commands being associated with a second task to be performed by the imaging device; transmit the first set of commands to the imaging device during a third time interval; and transmit the second set of commands to the imaging device during a fourth time interval that does not overlap the third time interval.

The memory 88, the processor 80 and bridge/system controller circuitry 84 may all be coupled to a host bus 82. The circuitry 84 may also interface the host bus 82 to an input/output (I/O) expansion bus 99 which is coupled to an I/O controller 90 and a network interface card 92, as examples. The computer 44 may also have, as examples, a mouse 93, floppy disk drive 94 and/or a keyboard 95 that are coupled to the I/O controller 90. A drive interface 101 may also be coupled to the bus 99 and interface a hard disk drive 96 and a CD-ROM drive 100 to the bus 99.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   accumulating commands generated by execution of an application program, the commands including an action command to cause an imaging device to perform an action and at least one set up command separate from the action command to set up the imaging device to perform the action;
   determining whether one of the commands generated by the execution of the application program is said action command;
   halting transmission of all of the accumulated commands to the imaging device in response to the determination that one of the commands is not the action command; and
   triggering transmission of all of the accumulated commands to the imaging device in response to the determination that one of the commands is the action command.

2. The method of claim 1, further comprising:
   responding to the determination by transmitting the accumulated commands to the imaging device during a time in which no other commands are transmitted to the imaging device.

3. The method of claim 1, wherein the imaging device comprises a digital camera, the method further comprising:
   transmitting all of the accumulated commands to the digital camera over a serial bus in response to the determination that one of the commands is the action command.

4. The method of claim 1, wherein the action command comprises a command to instruct the imaging device to capture a frame of a video image.

5. The method of claim 1, wherein the action command comprises a command to instruct the imaging device to capture a frame of a still image.

6. The method of claim 1, wherein the action command comprises a command to instruct the imaging device to deliver a frame of a previously captured still image to a computer over a serial bus.

7. The method of claim 1, wherein said at least one set up command comprises a command to instruct the imaging device to set an exposure time of the device.

8. The method of claim 1, wherein the accumulating, triggering and determining occur in response to execution of a driver program for the imaging device, the driver program being separate from the application program.

9. The method of claim 1, wherein the application program comprises one of a still image capture program and a video image capture program.

10. The method of claim 1, further comprising:
    preventing any of the accumulated commands from being transmitted to the imaging device until the determination that one of the commands is the action command.

11. An article comprising a storage medium storing instructions to cause a processor-based system to:

accumulate commands generated by execution of an application program, the commands including an action command to cause an imaging device to perform an action and at least one set up command separate from the action command to set up the imaging device to perform the action;

determine whether one of the commands generated by the execution of the application program is said action command;

halt transmission of all of the accumulated commands to the imaging device in response to the determination that one of the commands is not the action command; and trigger transmission of all of the accumulated commands to the imaging device in response to the determination that one of the commands is the action command.

12. The article of claim 11, the storage medium storing instructions to cause the processor-based system to:
respond to the determination by transmitting the accumulated commands to the imaging device during a time in which no other commands are transmitted to the imaging device.

13. The article of claim 11, wherein the imaging device comprises a digital camera, the storage medium storing instructions to cause the processor-based system to:
transmit all of the accumulated commands to the digital camera over a serial bus in response to the determination that one of the commands is the action command.

14. The article of claim 11, wherein the action command comprises a command to instruct the imaging device to capture a frame of a video image.

15. The article of claim 11, wherein the action command comprises a command to instruct the imaging device to capture a frame of a still image.

16. The article of claim 11, wherein the action command comprises a command to instruct the imaging device to deliver a frame of a previously captured still image to a computer over a serial bus.

17. The article of claim 11, wherein said at least one set up command comprises a command to instruct the imaging device to set an exposure time of the device.

18. The article of claim 11, wherein the instructions to cause the processor-based system to accumulate, trigger and determine are part of a driver program for the imaging device, the driver program being separate from the application program.

19. The article of claim 11, wherein the application program comprises one of a still image capture program and a video image capture program.

20. The article of claim 11, the storage medium storing instructions to cause the processor-based system to prevent any of the accumulated commands from being transmitted to the imaging device until the determination that one of the commands is the action command.

21. A system comprising:
a camera;
a serial bus coupled to the camera; and
a computer coupled to the serial bus, the computer to:
execute an application program to generate commands, the commands including an action command to cause the camera to perform an action and at least one set up command other than the action command to set up the camera to perform the action,
determine whether one of the commands generated by the execution of the application program is said action command,
halt transmission of all of the accumulated commands to the camera via the serial bus in response to the determination that one of the commands is not the action command, and
trigger transmission of all of the accumulated commands to the camera via the serial bus in response to the determination that one of the commands is the action command.

22. The system of claim 21, wherein the application program comprises one of a video image capture program and a still image capture program.

23. The system of claim 21, wherein the camera is a multimode camera having a first mode to capture a still image and a second mode to capture a video image.

24. The system of claim 21, wherein the computer prevents any of the accumulated commands from being transmitted to the camera device until the determination that one of the commands is the action command.

* * * * *